United States Patent [19]

Allen

[11] Patent Number: 4,610,641

[45] Date of Patent: Sep. 9, 1986

[54] DEVICE FOR ATTRACTING DEER AND ELK

[76] Inventor: Charles E. Allen, 120 Denman #9, Lufkin, Tex. 75901

[21] Appl. No.: 617,955

[22] Filed: Jun. 7, 1984

[51] Int. Cl.[4] .............................................. A63H 5/00
[52] U.S. Cl. ...................................... 446/397; 119/29; 428/16; 428/542.4; 446/418
[58] Field of Search ................ 446/397, 418; 434/295, 434/296, 297; 119/29 R, 144; 428/16, 542.4; 264/45.3

[56] References Cited

U.S. PATENT DOCUMENTS

| | | | |
|---|---|---|---|
| 2,003,896 | 6/1935 | Menger | 428/542.4 X |
| 3,224,412 | 12/1965 | Fuentes | 119/144 X |
| 3,834,354 | 9/1974 | Kelton | 119/144 X |
| 4,048,208 | 9/1977 | Spicuzza et al. | 264/45.3 |
| 4,464,440 | 8/1984 | Dotzman | 434/296 X |

OTHER PUBLICATIONS

Hackh: Hakh's Chemical Dictionary ©1969 by McGraw-Hill, Inc., pp. 610 and 659.

Primary Examiner—F. Barry Shay
Attorney, Agent, or Firm—Arnold, White & Durkee

[57] ABSTRACT

A device for attracting deer and elk includes a pair of members made of a synthetic polymer having a specific gravity from about 0.8 to about 1.2. Each of the members includes an elongate portion with a manually graspable handle near one end and at least two prongs formed on each of the elongated portions. Advantageously, at least three prongs are included and some of the prongs may be curved out of the plane of the elongate portion to facilitate the intermeshing of the members. A blowing agent and talc may be incorporated into the synthetic polymer. These added substituents are capable of creating a device which produces a sound very close to the sound created by deer or elk when they butt or clash their antlers during the mating season.

11 Claims, 2 Drawing Figures

DEVICE FOR ATTRACTING DEER AND ELK

BACKGROUND OF THE INVENTION

1. Field of the Invention

This invention relates generally to devices for attracting horned mammals and particularly to such devices for attracting deer and elk through the imitation of the sound of clashing antlers.

2. Brief Description of the Background Art

Hunters have known for some time that when deer or elk are in the mating season, bucks take part in a ritual wherein they butt or clash their antlers together. As a result of this ritual, sounds are created which attract other deer or elk, including both bucks and does, to the scene.

Hunters have attempted to take advantage of this phenomena by using antlers from previous prizes to simulate the sound of this ritual. The common practice is to cut the horns from the prize, and to clean and sand the horns. The horns are then raked and clashed with one another in order to produce a sound which imitates bucks fighting in the mating ritual. Hunters have had considerable success with these techniques.

Deer or elk antlers have certain disadvantages when used by man to attract animals. The antlers tend to lose their "live" sound over time. To overcome this, hunters treat or tune the antlers in an attempt to regain the original sound. Such efforts may involve soaking the antlers in water every two or three days or treating the antlers with linseed oil to keep them from becoming chalky. In addition, the severed antlers do not exhibit stability during varying weather conditions and may produce ineffective sounds depending on the weather. In addition to these deficiences, the availability of the larger sized antlers which are believed to be most suitable for attracting deer or elk, is limited and even those who have such antlers may hesitate to destroy their aesthetic value.

SUMMARY OF THE INVENTION

It is a primary object of the present invention to provide a device for attracting deer or elk, through the creation of the mating ritual sounds, that overcomes the above described disadvantages inherent in the use of deer or elk antlers.

These and other objects of the present invention are achieved by a device for attracting deer and elk that includes a pair of members made of a synthetic polymer. Each of the members includes an elongate portion with a manually graspable handle near one end and at least two prongs formed on each of the elongate portions. Although many advantages may be achieved with only two prongs, an even more realistic sound is possible when three or more prongs are utilized. In addition, where two or more prongs curve out of the plane of the handle member, it is easier to twist and rake the prongs across each other in order to produce the very distinct sound of natural antlers. Furthermore, by making the members mirror images of one another, it may be easier to clash the members together.

In accordance with another embodiment of the present invention, a device for attracting deer and elk includes a pair of members made of a synthetic polymer which has a specific gravity of from about 0.8 to about 1.2. With this specific gravity a very true sound is produced which accurately simulates the sound of clashing deer or elk antlers. Furthermore, the sound produced may be improved by interspersing talc through the synthetic polymer. This may be accomplished in a number of ways, including adding talc to the polymer during the formation stages. The desired specific gravity may be achieved by incorporating a blowing agent into the synthetic polymer so that the polymer is foamed or blown. Advantageously, the weight of the blowing agent is about one percent of the weight of the synthetic polymer and the weight of talc is about one-half percent of the weight of the polymer.

DESCRIPTION OF A PREFERRED EMBODIMENT

Figure 2:
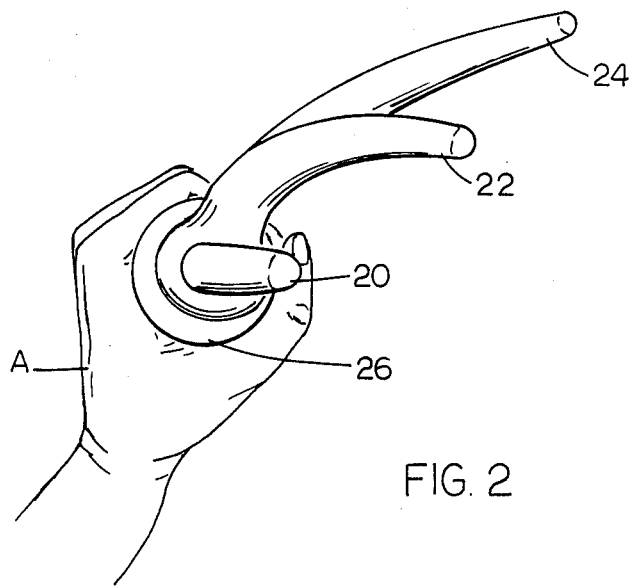
FIG. 2 is a top plan view of one of the members shown in FIG. 1, taken generally along the line 2—2 in FIG. 1.

Referring to the drawing wherein like reference characters are used for like parts throughout the several views, a device 10 for attracting deer and elk includes a pair of members 12, each of which include an elongate portion 14 which gradually tapers and curves from a handle 16, near one end, to a rounded tip 18. The region of the elongate portion 14 adjacent the tip 18, defines a first prong 20. A second prong 22, shorter than the first prong 20, extends away from the first prong 20 at about 40° in a Y configuration. In addition, a third prong 24, which is about the same length as the second prong 22 and located between the prong 22 and the handle 16, extends generally parallel to the second prong 22. The third prong 24 extends away from the portion 14 at about 60°. Advantageously, the prongs 20, 22 and 24 curve out of the plane that includes the handle 16, as best shown in FIG. 2. Conveniently, each prong 20, 22, 24 tapers as it extends to a free end.

While the device 10 has been described with respect to an embodiment in which three prongs 20, 22, and 24 are utilized, a device 10 including only two prongs such as the prongs 20 and 22 or the prongs 22 and 24 is also suitable. Nevertheless, the use of still additional prongs (not shown) may achieve, in appropriate circumstances, even better results. Further, although each member 12 is advantageously curved or non-planar to facilitate interaction between members 12, planar members 12 may be utilized as well.

The handle 16 is designed to be easily grasped in the human hand. It includes a pair of spaced annular stops 26 and 28 on either end which help to prevent injury to the hand and to prevent the members 12 from slipping through the user's hands, indicated as A in FIG. 1. Each of the handles 16 may include a ring 30 which enables the connection of the members 12 by way of the strap 32.

Figure 1:
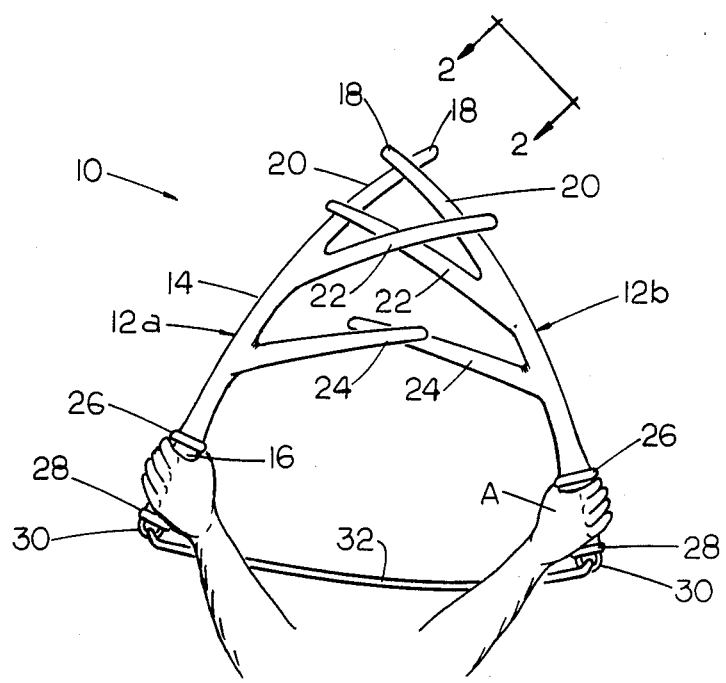
FIG. 1 is a perspective view of one embodiment of the present invention in use.

The two members 12a and 12b, shown in FIG. 1, are illustrated as being left and right mirror images of one another. In this way, the left and right mirror images 12a and 12b may be easily grasped, one in each of the user's hands, and twisted or intermeshed together in a convenient fashion.

The members 12 are made of any conventional synthetic polymer which can form a solid, rigid article. Advantageously, a medium or high impact resistant synthetic polymer such as high impact styrene or polycarbonate is used to form the members 12. Each member 12 may be formed as an integral piece by conventional plastic molding techniques such as injection molding. The members 12 may be made in identically shaped molds and the prongs 22 and 24 and portion 14 curved after molding, before the plastic is entirely set in order to create the mirror image configuration.

In accordance with a preferred embodiment of the present invention, the members 14 have a specific gravity of about 0.8 to about 1.2. The desired specific gravity may be achieved by incorporating a suitable blowing agent such as baking soda into the synthetic polymer, in an amount sufficient to achieve the desired specific gravity. This produces a porous, blown, or foamed plastic structure. In addition, talc may be mixed into the polymer during the molding operation. In one preferred embodiment of the present invention, about one gram of a blowing agent such as baking soda and about one-half gram of talc is added to every one hundred grams of a medium or high impact styrene. With these proportions a very desirable sound may be achieved when the members 12 are clashed.

In use, the member 12a is held in one hand and the member 12b is held in the other hand with the prongs 22, 24 extending away from the user. The prongs 20, 22 and 24 on each member 14 are then violently clashed together while supplying a twisting motion through the handles 16. This results in a twisting, raking, clashing interaction between the members 12 that produces a sound very close to that produced when deer or elk butt their antlers during the rutting season. A single member 12 may also be used to rake the ground and the bushes and to thump the ground.

While the present invention has been described with respect to a single preferred embodiment, those skilled in the art will appreciate a number of variations and modifications therefrom and it is intended within the appended claims to cover all such variations and modifications which come within the true spirit and scope of the present invention.

What is claimed is:

1. A device for attracting deer and elk comprising a pair of members made of a rigid synthetic polymer, each of said members including an elongate portion with a manually graspable handle near one end and at least two prongs formed on each of said elongate portions, said handle including annularly protruding means arranged to protect the user's hand.

2. The device of claim 1 wherein each of said elongate portions includes at least three prongs.

3. The device of claim 2 wherein at least two of said prongs of each elongate portion are curved.

4. The device of claim 3 wherein said two curved prongs curve out of the plane that includes said handle.

5. The device of claim 4 wherein one of said members is a mirror image of the other.

6. The device of claim 1 wherein said members are connected by an elongate flexible strand.

7. The device of claim 1 wherein said members have a specific gravity of from about 0.8 to about 1.2.

8. The device of claim 7 wherein said synthetic polymer is interspersed with talc.

9. The device of claim 8 wherein said polymer is foamed.

10. The device of claim 1 wherein said members are rigid and are each formed as an integral piece.

11. The device of claim 1 wherein said annularly protruding means is an annularly protruding ring arranged to protect the user's hand.

* * * * *